(12) United States Patent
Hamrin et al.

(10) Patent No.: US 9,487,100 B2
(45) Date of Patent: Nov. 8, 2016

(54) ELECTRICAL VEHICLE CHARGING DEVICE HAVING A BRAKE TO PREVENT EXTENSION AND RETRACTION OF THE POWER CONDUIT

(75) Inventors: Michelle Nicole Hamrin, Wethersfield, CT (US); John Kenneth Hooker, Louisville, KY (US); Ganesh Venkataraman, Rocky Hill, CT (US); Scott Charles Myers, Shepherdsville, KY (US); Joseph Sean Henry, Trumbull, CT (US)

(73) Assignee: General Electric Company, Schenectady, NY (US)

(*) Notice: Subject to any disclaimer, the term of this patent is extended or adjusted under 35 U.S.C. 154(b) by 792 days.

(21) Appl. No.: 13/619,563

(22) Filed: Sep. 14, 2012

(65) Prior Publication Data

US 2014/0077761 A1   Mar. 20, 2014

(51) Int. Cl.
*H02J 7/00* (2006.01)
*B60L 11/18* (2006.01)
*B60L 3/00* (2006.01)
*B60L 3/12* (2006.01)

(52) U.S. Cl.
CPC .......... *B60L 11/1825* (2013.01); *B60L 3/0023* (2013.01); *B60L 3/12* (2013.01); *B60L 11/1818* (2013.01); *B60L 11/1846* (2013.01); *B60L 2230/12* (2013.01); *B60L 2230/16* (2013.01); *B60L 2270/32* (2013.01); *B60L 2270/34* (2013.01); *Y02T 10/7005* (2013.01); *Y02T 10/7088* (2013.01); *Y02T 90/12* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC . Y02T 90/14; Y02T 10/7005; Y02T 90/128; Y02T 1/7088; Y02T 90/163; Y02T 90/12; Y02E 60/121; H02J 7/0068
USPC .................. 320/109, 137, 107, 104
See application file for complete search history.

(56) References Cited

U.S. PATENT DOCUMENTS

| | | | |
|---|---|---|---|
| 1,045,903 A | 12/1912 | Smith | |
| 4,127,241 A | 11/1978 | Conti | |
| 4,184,580 A * | 1/1980 | Ellis, Jr. | B60L 11/1825 194/239 |
| 4,489,223 A * | 12/1984 | Puckett | B65H 75/38 191/12.2 R |
| 5,297,664 A * | 3/1994 | Tseng | B60L 3/0069 194/217 |
| 5,743,348 A | 4/1998 | Coppola et al. | |
| 6,338,450 B1 | 1/2002 | Schwendinger | |
| 7,068,488 B1 * | 6/2006 | Van Leuven | 361/220 |
| 8,118,147 B2 * | 2/2012 | Ori | B60L 11/1824 191/12.2 A |
| 8,262,402 B2 * | 9/2012 | Gaul et al. | 439/304 |
| 9,054,535 B2 * | 6/2015 | Thomas et al. | |
| 2001/0023791 A1 * | 9/2001 | Nakajima | G01V 1/52 181/102 |
| 2002/0014562 A1 * | 2/2002 | Twisselmann | F16M 11/04 248/123.11 |
| 2003/0102845 A1 * | 6/2003 | Aker et al. | 320/139 |
| 2005/0134214 A1 * | 6/2005 | Geiger | B60R 11/02 320/111 |
| 2007/0096538 A1 | 5/2007 | Niemi et al. | |
| 2008/0091309 A1 | 4/2008 | Walker | |
| 2009/0121673 A1 * | 5/2009 | Nakayama et al. | 320/107 |

(Continued)

*Primary Examiner* — Stacy Whitmore
(74) *Attorney, Agent, or Firm* — General Electric Company

(57) ABSTRACT

A charging device for use with a power storage device includes a housing, a power conduit configured to deliver current to the power storage device, and a cable reel assembly coupled to the housing and to the power conduit. The cable reel assembly is configured to permit extension of a portion of said power conduit from said housing and to retract the portion of said power conduit into said housing.

20 Claims, 5 Drawing Sheets

(56) References Cited

U.S. PATENT DOCUMENTS

| | | | |
|---|---|---|---|
| 2010/0277127 A1* | 11/2010 | Flack | 320/137 |
| 2011/0013322 A1 | 1/2011 | Gale et al. | |
| 2011/0074351 A1* | 3/2011 | Bianco et al. | 320/109 |
| 2011/0115425 A1* | 5/2011 | Olsson | 320/101 |
| 2011/0156478 A1 | 6/2011 | Thorsell et al. | |
| 2011/0169447 A1 | 7/2011 | Brown et al. | |
| 2011/0169448 A1* | 7/2011 | Ichikawa | 320/109 |
| 2011/0175570 A1 | 7/2011 | Lucas | |
| 2012/0071017 A1* | 3/2012 | Gaul et al. | 439/304 |
| 2012/0074901 A1* | 3/2012 | Mohammed | 320/109 |
| 2012/0112697 A1* | 5/2012 | Heuer et al. | 320/109 |
| 2012/0232761 A1* | 9/2012 | Charnesky | 701/49 |
| 2012/0256589 A1* | 10/2012 | Ichikawa | B60L 11/1803 320/111 |
| 2012/0262115 A1* | 10/2012 | Ichikawa | B60L 11/005 320/109 |
| 2012/0313580 A1* | 12/2012 | Charnesky et al. | 320/109 |
| 2013/0043827 A1* | 2/2013 | Weinstein et al. | 320/103 |
| 2013/0181674 A1* | 7/2013 | Tremblay | B60L 11/1818 320/109 |
| 2013/0320913 A1* | 12/2013 | Chen | H02J 7/0042 320/103 |
| 2014/0002018 A1* | 1/2014 | Montemayor Cavazos et al. | 320/109 |
| 2015/0108947 A1* | 4/2015 | Heuer et al. | 320/109 |

* cited by examiner

ELECTRICAL VEHICLE CHARGING DEVICE HAVING A BRAKE TO PREVENT EXTENSION AND RETRACTION OF THE POWER CONDUIT

BACKGROUND OF THE INVENTION

The present application relates generally to charging devices and, more particularly, to a charging device, a detection system, and a method of testing the detection system.

As electric vehicles and/or hybrid electric vehicles have gained popularity, an associated need to accurately manage delivery of electrical energy to such vehicles has increased. Moreover, a need to provide safe and efficient charging devices or stations has been created by the increased use of such vehicles.

At least some known charging stations include a power cable or another conductor that may be removably coupled to the electric vehicle. The charging stations receive electricity from an electric utility distribution network or another electricity source, and deliver electricity to the electric vehicle through the power cable. Some known charging stations have cables that are relatively long to permit plugging into differently configured vehicles and to permit the power cable to reach vehicles at various distances from the charging station. Some known systems include a cable management system in which a portion of the power cable may be wrapped around, for example, one or more cleats to store the power cable when not in use and/or to store an unused portion of the power cable.

BRIEF DESCRIPTION OF THE INVENTION

In one embodiment, a charging device for use with a power storage device includes a housing, a power conduit configured to deliver current to the power storage device, and a cable reel assembly coupled to the housing and to the power conduit. The cable reel assembly is configured to permit extension of a portion of the power conduit from the housing and to retract the portion of the power conduit into the housing.

In another embodiment, a method of operating a charging device including a housing and a retractable power conduit coupled to a cable reel within the housing and configured to deliver current to a power storage device in an electric vehicle is described. The method includes selectively locking the power conduit to prevent extension and retraction of the power conduit relative to the housing.

In yet another embodiment, a charging device for use with an electric vehicle includes a housing, a power conduit, and a cable reel assembly coupled to the housing and to the power conduit. The power conduit includes a connector configured to connect to the electric vehicle. The power conduit is configured to deliver current to a power storage device in the electric vehicle. The cable reel assembly includes a cable reel configured to permit extension of the power conduit from the housing and to retract the power conduit into the housing, and a brake coupled to the cable reel. The brake is configured to selectively prevent extension and retraction of the power conduit.

DETAILED DESCRIPTION OF THE INVENTION

In some embodiments, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
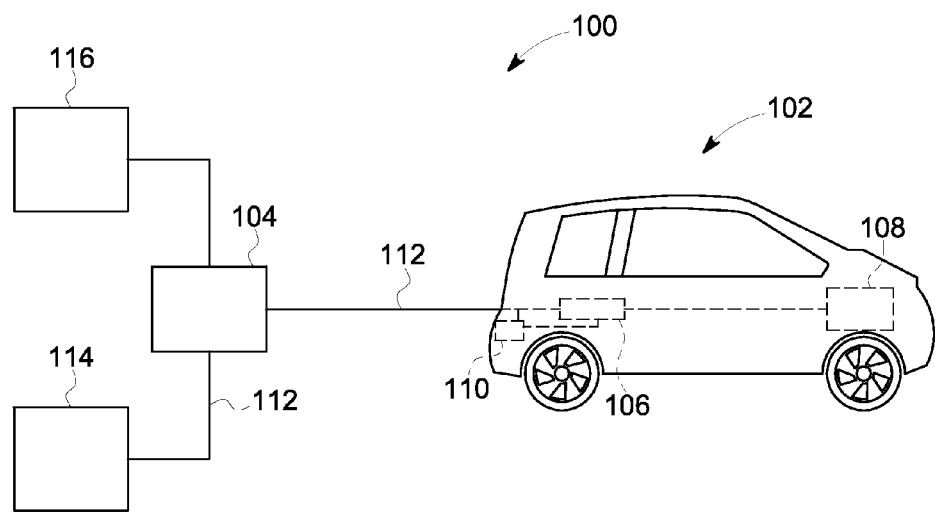
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. Moreover, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In the exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. Moreover, in the exemplary embodiment, charging device 104 is coupled to an electric power source 114, such as a power grid of an electric utility company, a generator, a battery, and/or any other device or system that provides electricity to charging device 104.

Charging device 104 is coupled to at least one server 116 through a network, such as the Internet, a local area network (LAN), a wide area network (WAN), and/or any other network or data connection that enables charging device 104 to function as described herein. Server 116, in the exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

Server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable storage medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112.

Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Moreover, charging device 104 may transmit signals to vehicle controller 110 indicating an amount and/or rate of electricity being delivered to power storage device 106. In some embodiments, vehicle controller 110 transmits one or more signals to charging device 104 indicating power conduit 112 is connected to electric vehicle 102. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
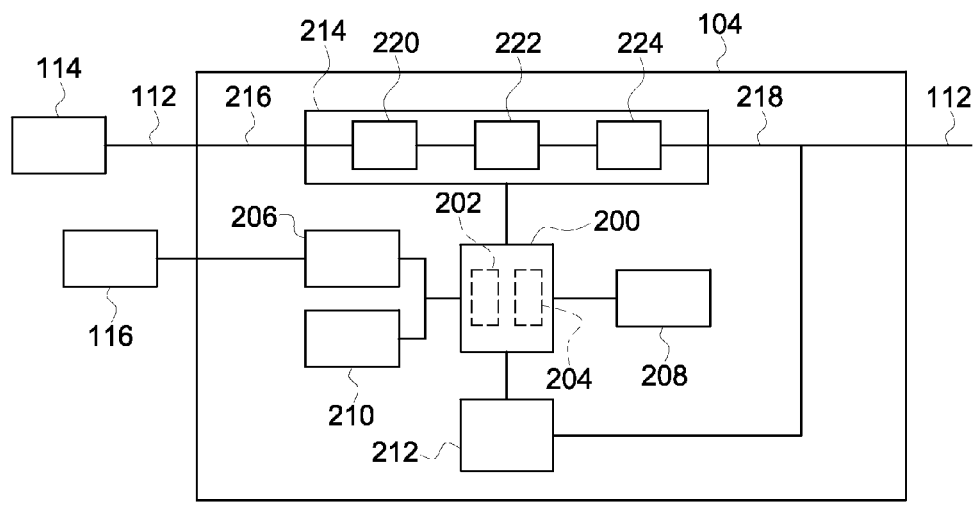
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface 210, to a vehicle communication module 212, and to a current control module 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system, such as server 116 (shown in FIG. 1). Network interface 206 communicates with server 116 and controller 200 using any suitable communication protocol, such as a wired and/or a wireless Ethernet protocol.

Display 208 may include a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In the exemplary embodiment, a charging status of power storage device 106 (shown in FIG. 1), payment information, user authentication information, power consumption information of charging device 104 and/or of electric vehicle 102, fault information of charging device 104 and/or of vehicle 102, and/or any other information may be displayed to a user on display 208.

User interface 210 includes, without limitation, a keyboard, a keypad, a touch-sensitive screen, a push button, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In an exemplary embodiment, the user may input user authentication information and/or payment information using user interface 210. Moreover, the user may operate user interface 210 to initiate and/or terminate the delivery of power to power storage device 106.

In an exemplary embodiment, vehicle communication module 212 is coupled to vehicle controller 110 (shown in FIG. 1) by power conduit 112 or by any other conduit that enables vehicle communication module 212 to function as described herein. Vehicle communication module 212 transmits data to, and receives data from, vehicle controller 110 using a suitable protocol, such as power line communication (PLC), a serial communication protocol, analog voltage level detection, duty cycle measurement, and/or any other protocol that enables vehicle communication module 212 to function as described herein. In an exemplary embodiment, vehicle communication module 212 communicates with vehicle controller 110 to control and/or adjust an amount of current that power storage device 106 draws from charging device 104.

Current control module 214 is coupled to an input end 216 of power conduit 112 and to an output end 218 of power conduit 112. Input end 216 is coupled to a power source, such as electric power source 114 (shown in FIG. 1), and output end 218 is coupled to a load, such as power storage device 106. More specifically, in an exemplary embodiment, input end 216 is coupled to a single phase of a three phase alternating current (AC) power source, such as electric power source 114. Alternatively, input end 216 may be coupled to a direct current (DC) power source or to two or three phases of an AC power source.

Current control module 214 includes at least one current protection device 220, at least one current control device 222, and at least one current sensor 224. In one embodiment, if power conduit 112 includes a plurality of conductors for receiving a plurality of phases of AC power from electric power source 114, each conductor of power conduit 112 may include a separate current protection device 220, current control device 222, and/or current sensor 224.

Current protection device 220, in an exemplary embodiment, is activated to electrically isolate input end 216 from output end 218 if the current flowing through power conduit 112 exceeds a predetermined threshold or current limit. More specifically, current protection device 220 activates, or "trips," when the current flowing through power conduit 112 exceeds a rated current limit of current protection device 220. When current protection device 220 activates or trips, current is prevented from flowing through power conduit 112 (i.e., input end 216 is electrically isolated from output end 218). In an exemplary embodiment, current protection device 220 is a circuit breaker. Alternatively, current protection device 220 may be a fuse, a relay, and/or any other device that enables current protection device 220 to function as described herein.

Current control device 222, in an exemplary embodiment, is a contactor 222 coupled to current protection device 220 by power conduit 112. Moreover, contactor 222 is coupled to, and is controlled by, controller 200. In an exemplary embodiment, controller 200 operates contactor 222 (e.g., opens contactor 222) to interrupt the current flowing through power conduit 112 if a ground fault is detected and/or if a ground fault detection system (not shown in FIG. 2) is determined to be operating incorrectly, as more fully described herein, such that input end 216 is electrically isolated from output end 218. As such, by operating or activating contactor 222, controller 200 prevents current from flowing to power storage device 106. In addition, controller 200 operates contactor 222 (e.g., closes contactor 222) to enable current to flow to power storage device 106, for example, if the ground fault detection system is determined to operate correctly.

At least one current sensor 224 measures and/or detects the current transmitted through power conduit 112 during operation of charging device 104. In an exemplary embodiment, current sensor 224 is a current transformer that measures an amount of current transmitted through power conduit 112 for use in detecting one or more ground faults. Current sensor 224 transmits one or more signals representative of the measured and/or detected current to controller 200.

Figure 3:
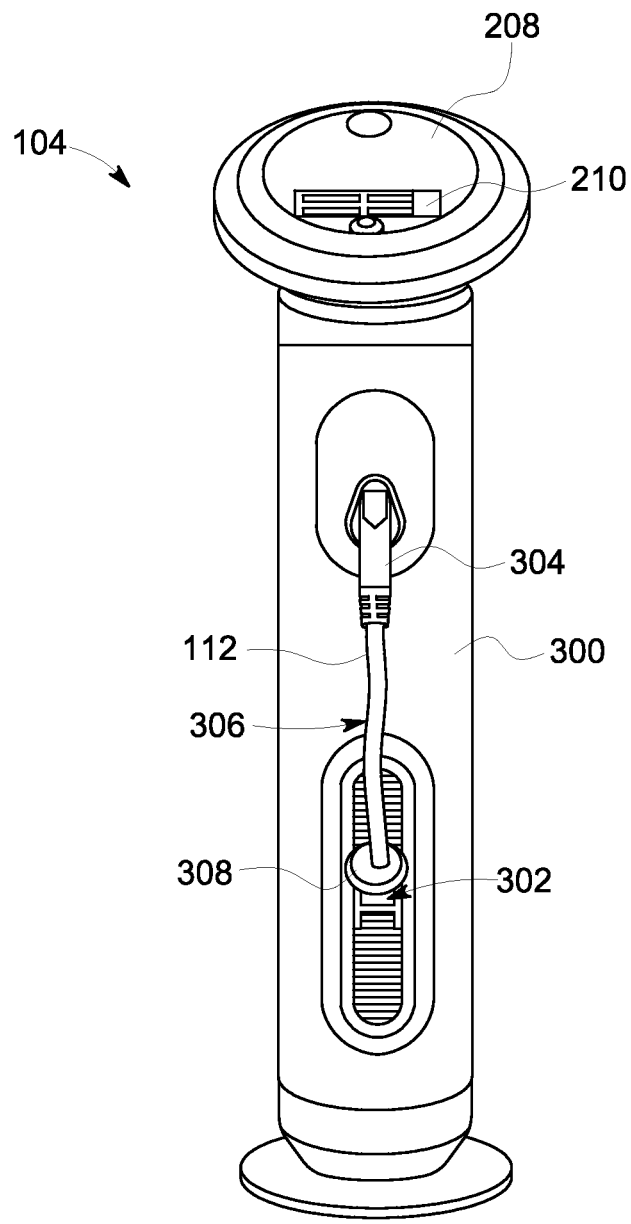
FIG. 3 is an exemplary charging device that may be used with the system shown in FIG. 1.
Figure 4:
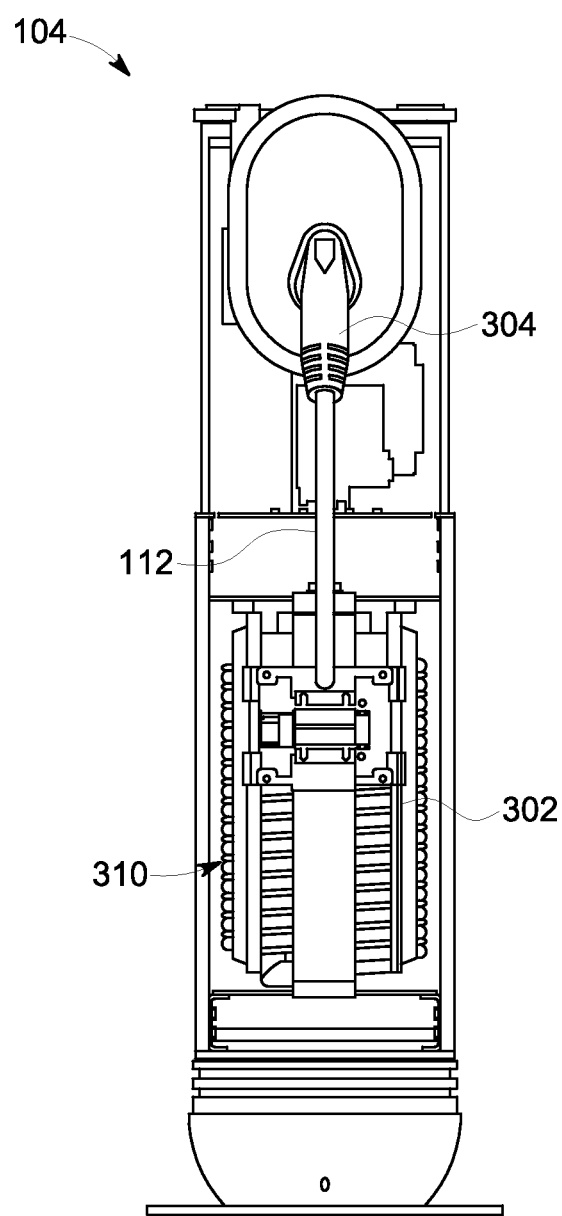
FIG. 4 is the exemplary charging device shown in FIG. 3 with its housing removed.

FIGS. 3 and 4 are illustrations of an exemplary charging device 104 that may be used with system 100 (shown in FIG. 1). In the exemplary embodiment, charging device 104 includes a housing 300. In FIG. 4, housing 300 is removed to show components of charging device 104 positioned within housing 300.

In the exemplary embodiment, power conduit 112 extends out of housing 300. Input end 216 (shown in FIG. 2) of power conduit 112 is positioned within housing 300. Power conduit 112 passes through an opening in housing 300, such that output end 218 (shown in FIG. 2) of power conduit 112 is positioned external to housing 300. Output end 218 includes a connector 304 configured for coupling power conduit 112 to power storage device 106. In the exemplary embodiment, connector 304 is configured to connect conduit 112 to electric vehicle 102 in order to couple conduit 112 to power storage device 106. In other embodiments, connector 304 is configured for direct connection to power storage device 106.

Power conduit 112 is extendable relative to housing 300 from a fully retracted position, shown in FIGS. 3 and 4, to a fully extended position (not shown). In the fully retracted position a first portion 306 (sometimes referred to as an external or outer portion) of power conduit 112 is positioned outside of housing 300. A stop 308 attached to power conduit 112, prevents conduit first portion 306 from retracting into housing 300. In other embodiments, stop 308 may be differently sized, located, and/or shaped. In some embodiments, stop 308 is located in a cable reel assembly (described below) to which conduit 112 is coupled. In still other embodiments stop 308 is omitted. In the fully retracted position, a second portion 310 (sometimes referred to as an internal or inner portion) of power conduit 112 is positioned inside of housing 300, as shown in FIG. 4.

As shown in FIG. 4, charging device 104 includes a cable reel assembly 302 positioned within housing 300. Conduit 112 is physically coupled to cable reel assembly 302. In the exemplary embodiment, cable reel assembly 302 is a spring loaded cable reel without a slip ring. In other embodiments, cable reel assembly may be any other suitable type of cable reel. In the fully retracted position, conduit second portion 310 is wrapped around cable reel assembly 302. Cable reel assembly 302 permits the extension of power conduit 112 from charging device 104.

When power conduit 112 is pulled away from charging device 104, such as by a user of charging device 104, conduit 112 unwinds from cable reel assembly 302. Some of conduit second portion 310 passes through hole to the outside of housing 300, thereby increasing the length of conduit 112 outside of housing 300 and decreasing the amount of conduit 112 within housing 300. In the exemplary embodiment, the unwinding of conduit 112 rotates a drum (not shown in FIG. 4) on which conduit 112 is wound. The rotation of the drum is resisted by a spring assembly (not shown in FIG. 4) of cable reel assembly 302. When a force pulling power conduit 112 away from charging device 104 is not present (e.g., when a user release power conduit 112), the spring assembly causes the drum to rotate to wind power conduit 112 onto the drum and thereby retract power conduit 112 into housing 300.

Cable reel assembly 302 is configured to selectively lock to prevent extension and/or retraction of power conduit 112. Cable reel assembly 302 includes a lock (not shown in FIGS. 3 and 4) configured to lock the drum on which conduit 112 is wound. In the exemplary embodiment, when the lock is enabled, the drum is prevented from rotating and power conduit 112 is thereby prevented from being extended or retracted relative to housing 300. In other embodiments, the lock may be configured to selectively prevent rotation of the drum in one direction while permitting rotation in the opposite direction, thereby preventing only one of extension and retraction of conduit 112 relative to housing 300. In the exemplary embodiment, the lock is a passive magnetic brake. More specifically, the brake includes a permanent magnet that creates friction that prevents the drum from rotating. In the absence of any instructions from the controller, and similarly in the absence of electrical power to charging device 104, the brake is and remains locked to prevent extension/retraction of power conduit 112. To disable the brake, controller 200 energizes a coil that electromagnetically overcomes the magnetic field created by the permanent magnet, thereby allowing the drum to rotate freely. To enable the brake, the coil is de-energized, allowing the magnetic field of the permanent magnet to prevent rotation of the drum. In other embodiments any other suitable mechanism for preventing extension and/or retraction of conduit 112 relative to housing 300 may be used. In some embodiments, an electromagnetic brake is energized by controller 200 to enable the brake and de-energized by controller 200 to disable the brake. In other embodiments, cable reel assembly 302 may be driven by, or replaced with, an electric motor configured to extend and retract power conduit 112. In some embodiments including such an electric motor, the electric motor is also used as a brake to prevent extension and retraction of power conduit 112 and a separate brake or lock is not included.

Controller 200 is configured to selectively enable and disable the brake in cable reel assembly 302 to prevent extension and/or retraction of power conduit 112. In the exemplary embodiment, controller 200 is configured, such as via instruction contained in memory device 204, to enable the brake when power conduit 112 is coupled to power storage device 106. Thus, when a user connects connector 304 to electric vehicle 102, controller 200 enables the brake to prevent conduit 112 from extending from or retracting into housing 300. In other embodiments, controller 200 enables the brake to prevent retraction of power conduit 112 into housing, but permits conduit 112 to be further extended from housing 300. In the exemplary embodiment, controller 200 enables the brake to prevent extension and/or retraction of power conduit 112 in response to receiving a signal from electric vehicle 102, such as from vehicle controller 110, indicating that power conduit 112 is coupled to electric vehicle 102. In other embodiments, controller 200 enables the lock in response to other suitable signals. In some embodiments, for example, the lock is enabled in response to power being provided through power conduit 112, in response to user selection to lock the power conduit, in response to a signal from sensor in connector 304 indicating connector 304 is properly connected to an electric vehicle, etc.

When power conduit 112 is decoupled from electric vehicle 102, controller 200 disables the brake in cable reel assembly 302 to permit extension and/or retraction of power conduit 112. Thus, when a user disconnects connector 304 from electric vehicle 102, controller 200 disables the brake to permit conduit 112 to extend from and retract into housing 300. In other embodiments, controller 200 disables the brake to permit retraction of power conduit 112 into housing 300, but prevents conduit 112 from being further extended from housing 300. In the exemplary embodiment, controller 200 disables the brake in response to the cessation of a signal from electric vehicle 102, such as from vehicle controller 110, indicating that power conduit 112 is coupled to electric vehicle 102. In other embodiments, controller 200 enables the lock in response to other suitable signals.

In some embodiments, controller 200 is configured, additionally or alternatively, to enable the brake in cable reel assembly 302 to prevent extension of power conduit 112 from housing 300 when use of charging device 104 is not permitted. Thus, when conduit 112 is in the fully retracted position and use of charging device 104 has not been authorized, such as by user authentication information and/or payment information input using user interface 210, controller 200 locks cable reel assembly 302 to prevent extension of power conduit 112 from housing 300. Upon authorization of a user to use charging device 104, controller 200 disables the brake to permit extension and retraction of power conduit 112 relative to housing 300. Moreover, in some embodiments, charging device 104 includes a release button (not shown) for receiving a user instruction to disable the brake in cable reel assembly 302. Thus, for example, if charging device does not require authorization for use, controller 200 may still lock conduit 112 in the fully retracted position and the user may instruct controller 200 to release the brake by activating the release button.

In some embodiments, charging device 104 includes a conduit position sensor (not shown) communicatively coupled to controller 200. The conduit position sensor is configured to detect the position of conduit 112 relative to housing 300 and provide an indication of the position to controller 200. Thus, controller 200 knows whether power conduit 112 is fully retracted, fully extended, or partially extended/retracted. In some embodiments, controller 200 is configured to enable the brake in cable reel assembly 302 to prevent unauthorized use of charging device 104 when use is not authorized and conduit 112 is in the fully retracted position. In some embodiments, the position sensor is an optical sensor configured to detect one or more marks on power conduit 112 that indicate the position of power conduit 112. In other embodiments, the position sensor is a rotation sensor configured to detect the revolutions of cable reel assembly 302. The rotation sensor may be any suitable optical, mechanical, and/or electrical sensor for monitoring the revolutions of cable reel assembly. In one embodiment, the rotation sensor is a limit switch.

Figure 5:
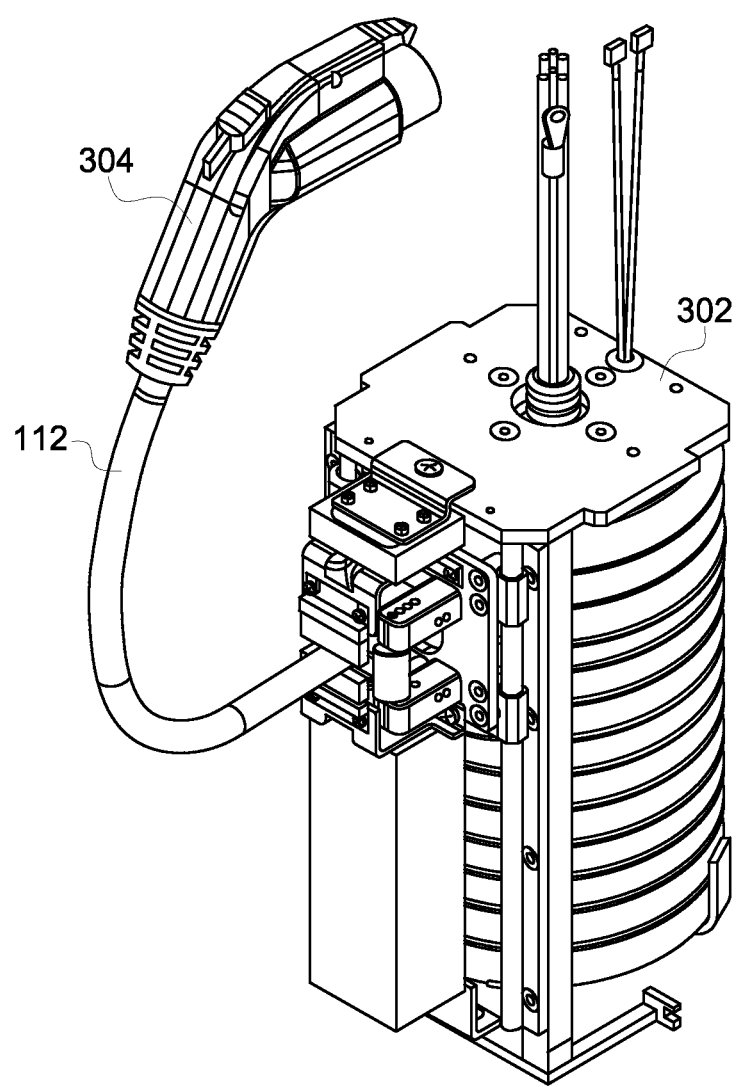
FIG. 5 is an exemplary cable reel assembly that may be used with charging device shown in FIG. 3.
Figure 6:
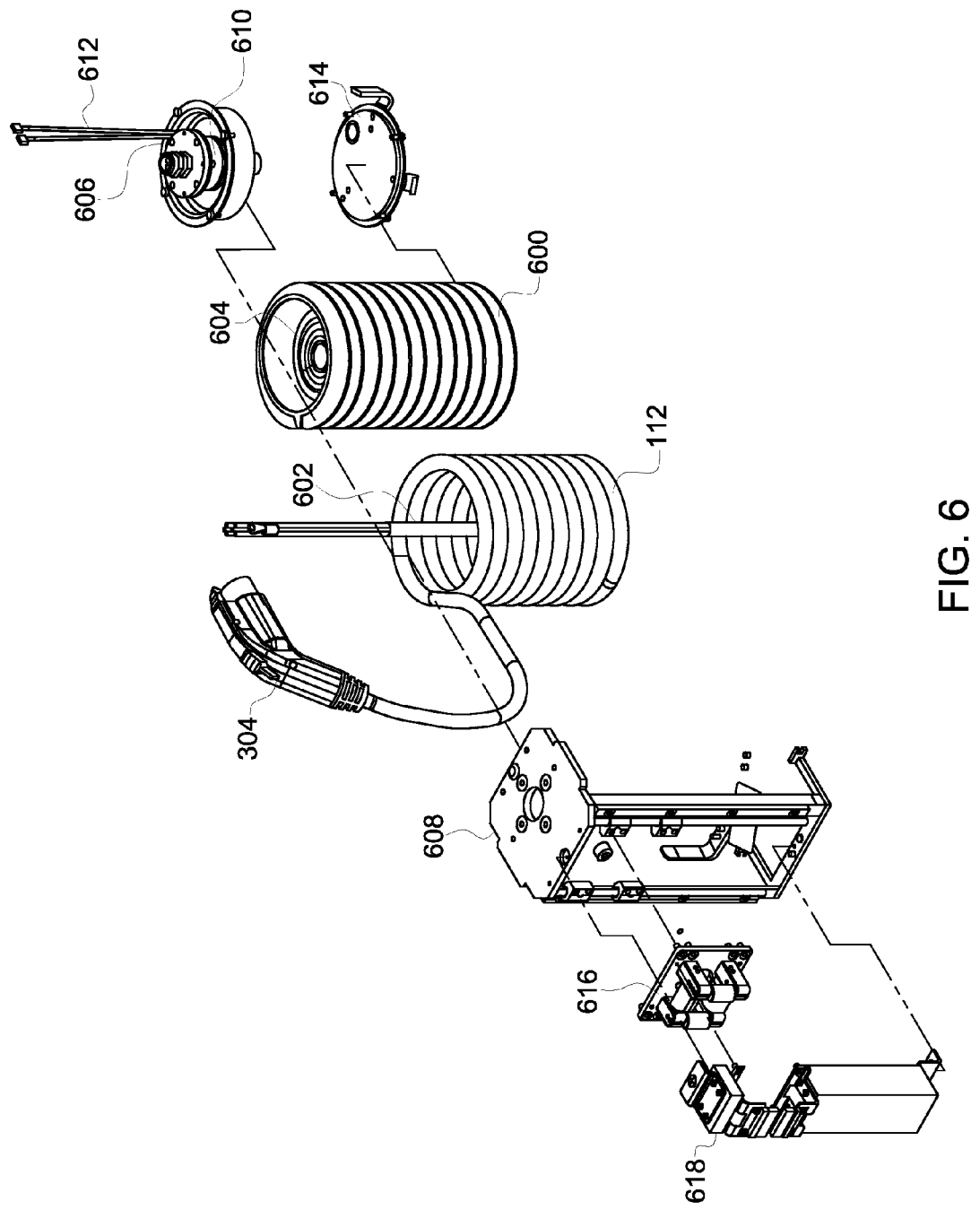
FIG. 6 is an exploded view of the exemplary cable reel assembly shown in FIG. 5.

FIG. 5 is an illustration of an exemplary cable reel assembly 302 that may be used with system 100 (shown in FIG. 1). Power conduit 112 is illustrated mounted on cable reel assembly 302 with connector 304 connected to output end 218. FIG. 6 is an exploded view of the exemplary cable reel assembly 302 shown in FIG. 5.

As shown in FIG. 6, cable reel assembly 302 includes a cable drum 600. Power conduit 112 is wound on cable drum 600. Cable drum 600 rotates about shaft 602 to permit winding and unwinding of conduit 112 about drum 600. Cable drum 600 includes spring 604 configured to resist unwinding of conduit 112 and facilitate retracting conduit 112 and winding it about drum 600.

Bottom cap assembly 606 mounts to the bottom of cable drum 600 and assembly frame 608. Bottom cap assembly 606 includes electromagnetic brake 610. In the exemplary embodiment, electromagnetic brake 610 is a twenty-four volt electromagnetic brake. In other embodiments, electromagnetic brake 610 is any other brake or mechanical stop suitable for functioning as described herein. Brake wires 612 connect brake 610 to a power source (not shown) that powers brake 610. When controller 200 connects brake wires 612 to the power source, such as via switches, relays, etc., brake 610 is disabled by generating a magnetic field that overcomes the magnetic field of a permanent magnet that prevents rotation of drum 600. Controller 200 enables brake 600 by disconnecting brake wires 612 from the power source. The previously generated magnetic field is no longer generated and the permanent magnet prevents drum 600 from being rotated. A top cap assembly 614 is attached to cable drum 600 on the top side of cable drum 600.

A roller assembly 616 and bellows 618 are coupled to frame 608. Conduit 112 passes through roller assembly 616 and bellows 618. Roller assembly 616 guides and provides rotary motion for power conduit 112 where it exits/enter housing 300. Roller assembly 616 moves up and down along frame 608 as conduit winds and unwinds from cable drum 600. Bellows 618 helps cover openings that would otherwise be created by the movement of roller assembly 616.

As described herein, a robust and effective charging device is provided. The charging device includes a retractable/extendable power conduit to provide cable management. A retractable power conduit provides a neater charging station installation and may reduce clutter and potential accidents caused by excess power conduit that is not properly stored. Moreover, in some embodiments described herein, the charging station is configured to selectively prevent extension and/or retraction of the power conduit relative to the housing. This selective locking permits the conduit to be prevented from retracting in some embodiments when the conduit is coupled to an electric vehicle, thereby reducing the likelihood that the power conduit will unintentionally disconnected from the electric vehicle. Moreover, in embodiments in which the charging station locks the power conduit in the retracted position when use of the charging station is not authorized, theft and vandalism involving the power conduit may be reduced.

A technical effect of the device, system, and method described herein includes at least one of (a) locking a power conduit to prevent extension and retraction of the power conduit relative to a housing; (b) locking a power conduit to prevent extension of the power conduit relative to a housing; and (c) locking a power conduit to prevent retraction of a power conduit relative to a housing.

Exemplary embodiments of a charging device and method of operating a charging device are described above in detail. The charging device and method are not limited to the specific embodiments described herein, but rather, components of the charging device and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric vehicle charging device for charging a power storage device of an electric vehicle, said electric vehicle charging device comprising:
    a housing,
    a power conduit configured to couple to the electric vehicle to deliver current to the electric vehicle's power storage device to charge the power storage device, said power conduit comprising a connector configured to connect said power conduit to the electric vehicle;
    a cable reel assembly coupled to said housing and to said power conduit, said cable reel assembly configured to permit extension of a portion of said power conduit from said housing and retraction of the portion of said power conduit into said housing, said cable reel assembly comprising a brake configured to selectively prevent extension and retraction of said power conduit relative to said housing; and
    an electronic controller within said housing, said controller configured to selectively enable said brake to prevent extension and retraction of said power conduit relative to said housing in response to a signal indicating said connector is connected to the electric vehicle.

2. An electric vehicle charging device in accordance with claim 1, wherein said brake comprises an electromagnetic brake.

3. An electric vehicle charging device in accordance with claim 2, wherein said brake comprises a permanent magnet configured to prevent extension and retraction of said power conduit relative to said housing.

4. An electric vehicle charging device in accordance with claim 3, wherein said brake is configured to electromagnetically overcome a magnetic field created by said permanent magnet in response to a signal from said electronic controller to permit extension and retraction of said power conduit relative to said housing.

5. An electric vehicle charging device in accordance with claim 1, wherein said controller is configured to disable said brake to permit extension and retraction of said power conduit relative to said housing when said conduit is disconnected from the power storage device.

6. An electric vehicle charging device in accordance with claim 1, wherein said controller is configured to enable said brake to prevent extension of said power conduit relative to said housing when use of said charging device is not authorized.

7. An electric vehicle charging device in accordance with claim 6, further comprising a sensor configured to detect a position of said power conduit relative to said housing, and wherein said controller is configured to enable said brake to prevent extension of said power conduit when said sensor detects said power conduit is in a fully retracted position within said housing and use of said charging device is not authorized.

8. The electric vehicle charging device in accordance with claim 6, wherein said controller is configured to:
    receive at least one of user authentication information and payment information input associated with a user;
    authorize the user based at least partially on the received user authentication information and payment information input; and
    upon authorization of the user, disable said brake to permit extension and retraction of said power conduit relative to said housing.

9. The electric vehicle charging device in accordance with claim 1, wherein said controller is further configured to receive the signal indicating said connector is connected to the electric vehicle from one of (i) a sensor coupled to said connector that is configured to detect a connection between said connector and the electric vehicle, (ii) a vehicle controller of the electric vehicle, and (iii) a sensor configured to detect flow of power from said electric vehicle charging device to the electric vehicle.

10. A method of operating an electric vehicle charging device including a housing, an electronic controller, and a retractable power conduit coupled to a cable reel within the housing, the retractable power conduit including a connector configured to connect to the electric vehicle, the charging device configured to deliver current to a power storage device in an electric vehicle, said method comprising:

selectively locking the power conduit by the electronic controller to prevent extension and retraction of the power conduit relative to the housing in response to a signal indicating the connector is connected to the electric vehicle to deliver current to the power storage device.

11. A method in accordance with claim 10, further comprising unlocking the power conduit to permit extension and retraction of the power conduit relative to the housing when the power conduit is decoupled from the electric vehicle.

12. A method in accordance with claim 10, wherein selectively locking the power conduit comprises locking the power conduit to prevent extension of the power conduit from the housing when the use of the charging device is not authorized.

13. A method in accordance with claim 12, wherein locking the power conduit to prevent extension of the power conduit from the housing when the use of the charging device is not permitted comprises locking the power conduit to prevent extension of the power conduit from the housing when a sensor detects the power conduit is in a fully retracted position within the housing and use of the charging device is not authorized.

14. The method in accordance with claim 13 further comprising:

receiving, by the controller at least one of user authentication information and payment information input associated with a user;

authorizing the user based at least partially on the received user authentication information and payment information input; and upon authorization of the user, unlocking the power conduit to permit extension and retraction of the power conduit relative to the housing.

15. The method in accordance with claim 10, wherein selectively locking the power conduit further comprises receiving the signal indicating the connector is connected to the electric vehicle from one of (i) a sensor coupled to the connector that is configured to detect a connection between the connector and the electric vehicle, (ii) a vehicle controller of the electric vehicle, and (iii) a sensor configured to detect flow of power from the electric vehicle charging device to the electric vehicle.

16. An electric vehicle charging device for charging a power storage device of an electric vehicle, said electric vehicle charging device comprising:

a housing, a power conduit including a connector configured to connect to the electric vehicle, said power conduit configured to deliver current to a power storage device in the electric vehicle; and a cable reel assembly coupled to said housing and to said power conduit, said cable reel assembly comprising:

a cable reel configured to permit extension of said power conduit from said housing and to retract said power conduit into said housing; and a brake coupled to said cable reel, said brake configured to selectively prevent both extension and retraction of said power conduit in response to said connector connecting to the electric vehicle to deliver current to the power storage device in the electric vehicle.

17. An electric vehicle charging device in accordance with claim 16, further comprising a controller communicatively coupled to said brake, said controller configured to selectively enable said brake to prevent extension and retraction of said power conduit in response to a signal indicating said connector is connected to the electric vehicle.

18. An electric vehicle charging device in accordance with claim 17, wherein said controller is configured to disable said brake to permit extension and retraction of said power conduit relative when said power conduit connector is decoupled from the electric vehicle.

19. The electric vehicle charging device in accordance with claim 17, wherein said controller is further configured to receive the signal indicating said connector is connected to the electric vehicle from one of (i) a sensor coupled to said connector that is configured to detect a connection between said connector and the electric vehicle, (ii) a vehicle controller of the electric vehicle, and (iii) a sensor configured to detect flow of power from said electric vehicle charging device to the electric vehicle.

20. An electric vehicle charging device in accordance with claim 16, wherein said controller is configured to enable said brake when use of said charging device is not authorized.

* * * * *